(12) United States Patent
Sakiyama

(10) Patent No.: US 9,902,206 B2
(45) Date of Patent: Feb. 27, 2018

(54) AIRCRAFT TIRE

(71) Applicant: BRIDGESTONE CORPORATION, Chuo-ku, Tokyo (JP)

(72) Inventor: Tomotaka Sakiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 317 days.

(21) Appl. No.: 14/785,631

(22) PCT Filed: Apr. 15, 2014

(86) PCT No.: PCT/JP2014/060754
§ 371 (c)(1),
(2) Date: Oct. 20, 2015

(87) PCT Pub. No.: WO2014/175126
PCT Pub. Date: Oct. 30, 2014

(65) Prior Publication Data
US 2016/0075181 A1 Mar. 17, 2016

(30) Foreign Application Priority Data

Apr. 25, 2013 (JP) .................................. 2013-092585

(51) Int. Cl.
*B60C 9/22* (2006.01)
*B60C 9/20* (2006.01)
(Continued)

(52) U.S. Cl.
CPC .............. *B60C 9/20* (2013.01); *B60C 9/0057* (2013.01); *B60C 9/22* (2013.01); *B60C 11/03* (2013.01);
(Continued)

(58) Field of Classification Search
CPC .. B60C 9/22; B60C 9/0057; B60C 2009/2223
See application file for complete search history.

(56) References Cited

U.S. PATENT DOCUMENTS 3,990,493 A 11/1976 Caretta
4,865,098 A * 9/1989 Majerus .............. B60C 11/0306
152/209.1
(Continued)

FOREIGN PATENT DOCUMENTS

EP 1526003 A1 4/2005
JP S50-78004 A 6/1975
(Continued)

OTHER PUBLICATIONS

English machine translation of JP61-268505, dated Nov. 1986.*
European Search Report dated Feb. 16, 2016, issued in corresponding EP Patent Application.

*Primary Examiner* — Robert C Dye
(74) *Attorney, Agent, or Firm* — SOLARIS Intellectual Property Group, PLLC

(57) ABSTRACT

In order to suppress the dimensions and mass of an aircraft tire from becoming uneven around the tire circumferential direction, an aircraft tire includes: a belt layer provided further to a tire radial direction outside than a carcass; and a sheet shaped belt protection member that is wound around a tire circumferential direction TC between a tread section and the belt layer, and that includes incision portions incised along a tire width direction TW, with the incision portions formed at uniform intervals around the tire circumferential direction TC.

2 Claims, 4 Drawing Sheets

(51) Int. Cl.
 B60C 9/00 (2006.01)
 B60C 11/03 (2006.01)
 B60C 11/04 (2006.01)
 B60C 9/18 (2006.01)

(52) U.S. Cl.
 CPC ....... *B60C 11/04* (2013.01); *B60C 2009/1828* (2013.01); *B60C 2009/2048* (2013.01); *B60C 2009/2223* (2013.01); *B60C 2011/0341* (2013.01); *B60C 2200/02* (2013.01)

(56) References Cited

U.S. PATENT DOCUMENTS

2002/0056497 A1 5/2002 Togo
2013/0276949 A1 10/2013 Yano

FOREIGN PATENT DOCUMENTS

| JP | 61-268505 | * 11/1986 |
|----|-----------|-----------|
| JP | S62-273837 A | 11/1987 |
| JP | 2002-87018 A | 3/2002 |
| JP | 2009-90870 A | 4/2009 |
| JP | 2012-71762 A | 4/2012 |
| JP | 2012-153310 A | 8/2012 |

* cited by examiner

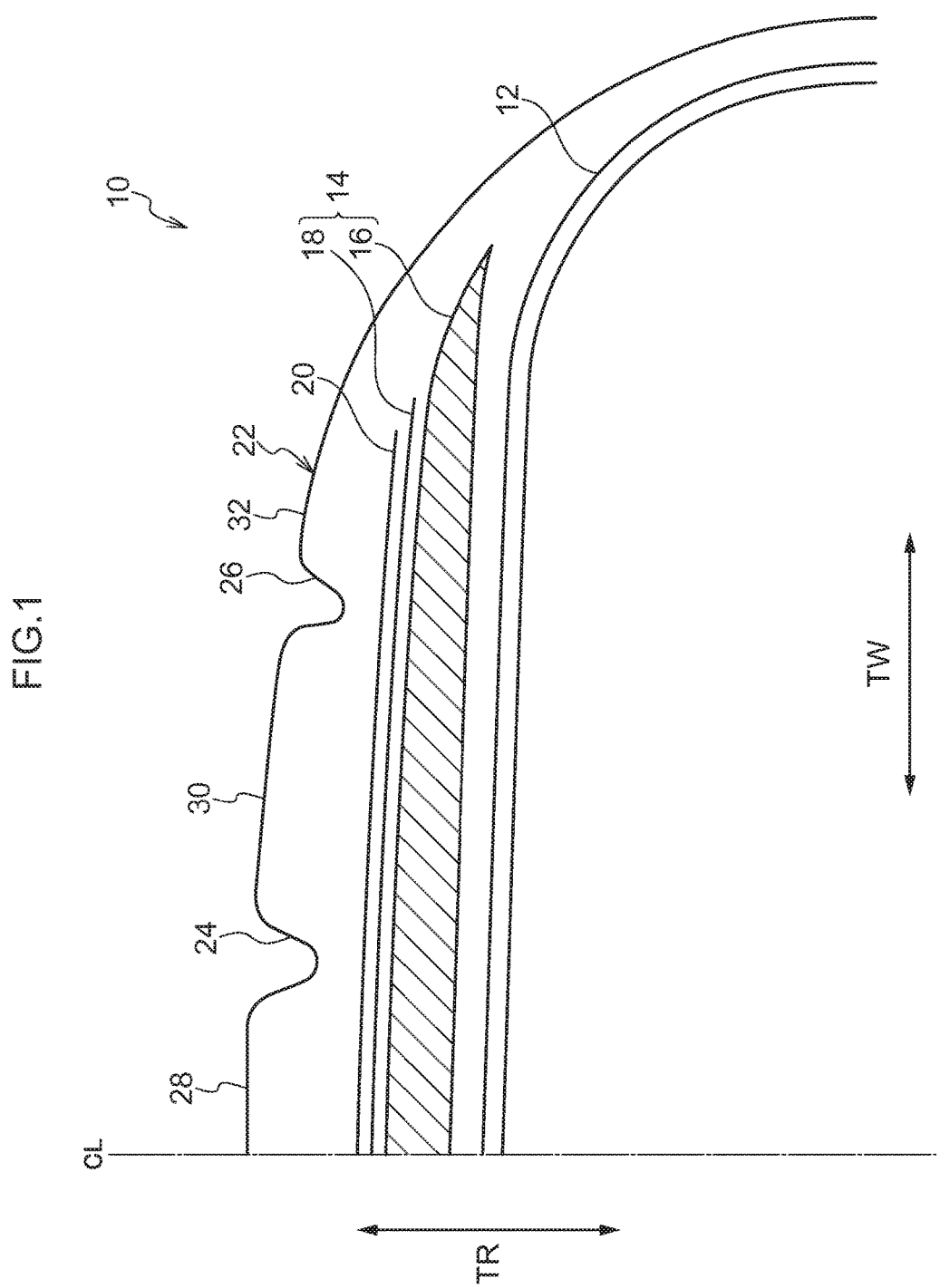

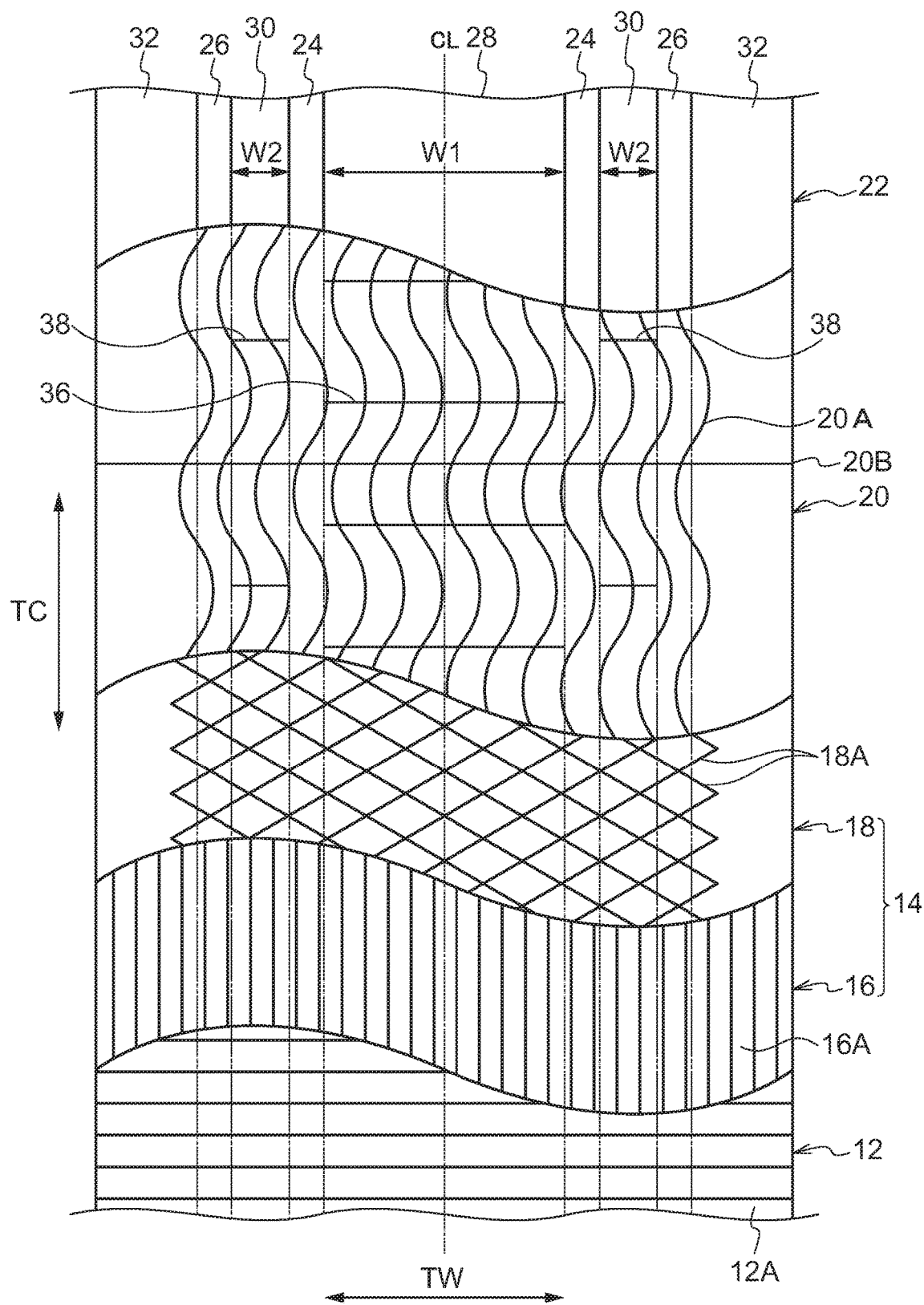

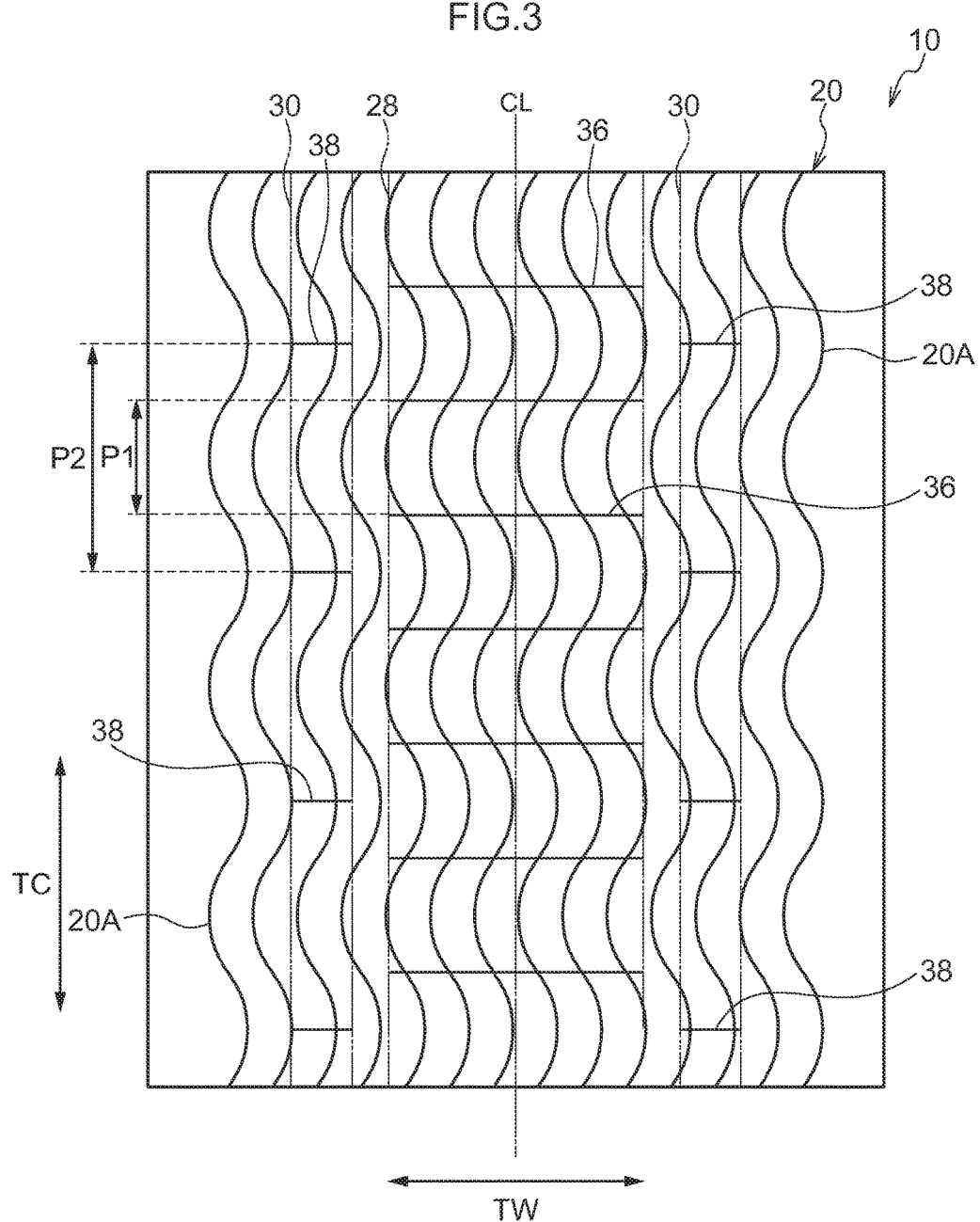

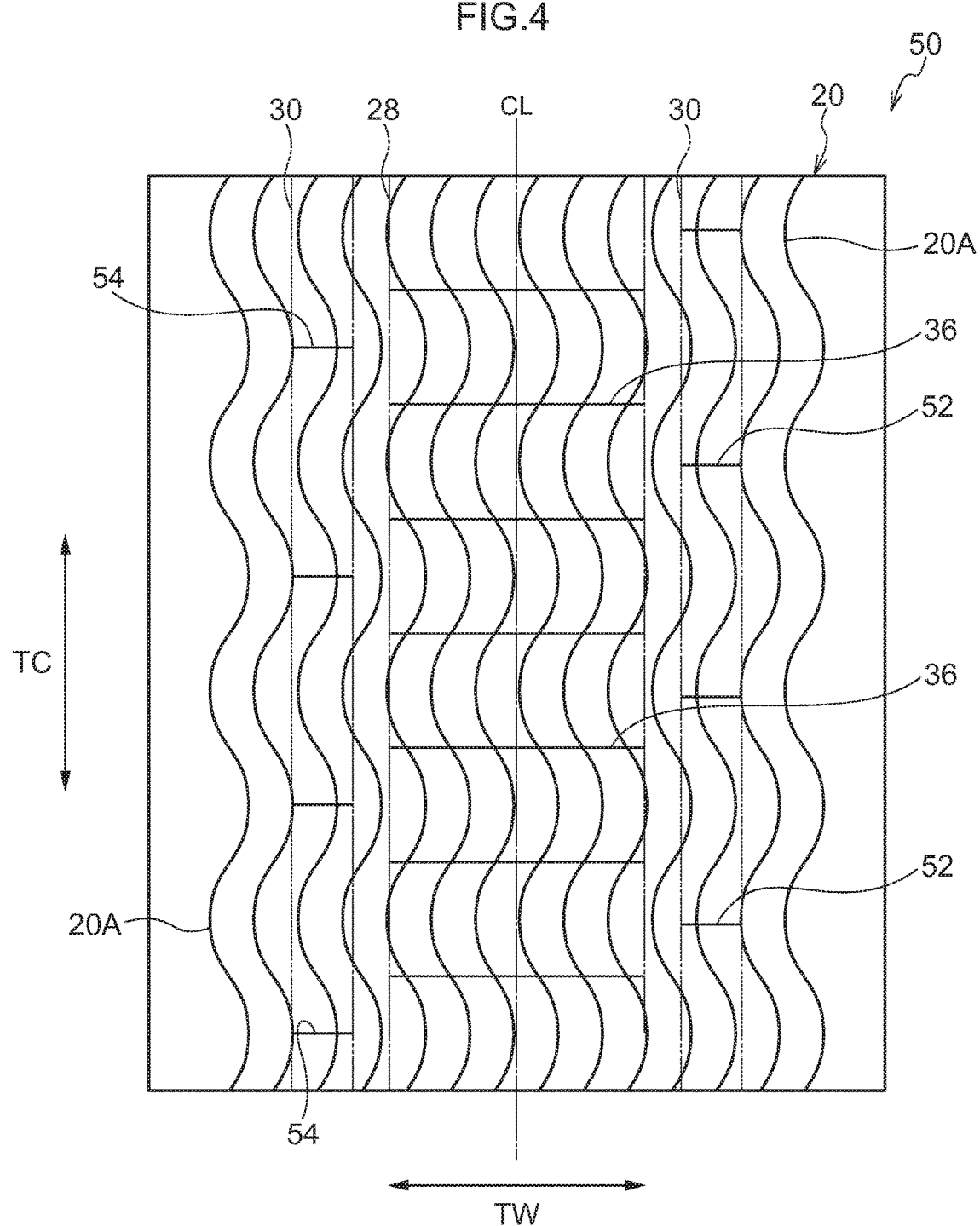

AIRCRAFT TIRE

TECHNICAL FIELD

The present invention relates to an aircraft tire, primarily for use in passenger aircraft or the like.

BACKGROUND ART

Japanese Patent Application Laid-Open (JP-A) No. 2012-153310 describes an aircraft tire including a belt layer at the tire radial direction outside of a carcass, in which a sheet shaped belt protection layer (belt protection member) that protects the belt layer is wound in the tire circumferential direction at the circumferential outside of the belt layer.

SUMMARY OF INVENTION

Technical Problem

When the aircraft tire described above runs over a protruding object when running, the belt protection member contacts the protruding object, enabling ingress of the protruding object into the belt layer to be suppressed. A large centrifugal force arises in the aircraft tire due to high speed rotation during take-off and landing. Due to the centrifugal force, there are accordingly concerns of bulging out at portions of weaker strength, such as a joint in the belt protection member, and of the dimensions and mass becoming uneven around the tire circumferential direction.

In consideration of the above circumstances, an object of the present invention is to provide an aircraft tire that suppresses the dimensions and mass of the aircraft tire from becoming uneven around the tire circumferential direction.

Solution to Problem

An aircraft tire according to a first aspect includes: a belt layer provided further to a tire radial direction outer side than a carcass; and a sheet shaped belt protection member that is wound in a tire circumferential direction between a tread section and the belt layer, and that includes incision portions incised in a tire width direction, with the incision portions formed at uniform intervals in the tire circumferential direction.

Advantageous Effects of Invention

Due to the above configuration, the present invention enables the dimensions and mass of the aircraft tire to be suppressed from becoming uneven around the tire circumferential direction.

BRIEF DESCRIPTION OF DRAWINGS

FIG. 1 is a cross-section taken along the axis of rotation of a tire, illustrating the half of an aircraft tire according to a first exemplary embodiment on the right side of a tire equatorial plane.

FIG. 2 is a plan view illustrating an internal structure of an aircraft tire according to the first exemplary embodiment.

FIG. 3 is a plan view illustrating a belt protection member according to the first exemplary embodiment.

FIG. 4 is a plan view illustrating a belt protection member according to a second exemplary embodiment.

DESCRIPTION OF EMBODIMENTS

First Exemplary Embodiment

Explanation follows regarding an aircraft tire 10 (referred to below as the tire 10) according to a first exemplary embodiment of the present invention, with reference to the drawings. In the drawings, the arrow TW indicates a direction parallel to the axis of rotation of the tire 10 (referred to below as the "tire width direction" as appropriate). The arrow TR indicates a radial direction passing through the axis of rotation of the tire 10 orthogonally to the tire width direction (referred to below as the "tire radial direction" as appropriate). The arrow TC indicates the circumferential direction of a circle centered on the axis of rotation of the tire 10 (referred to below as the "tire circumferential direction" as appropriate). In the drawings, CL indicates an equatorial plane (a face perpendicular to the axis of rotation of the tire, and passing through the axial direction center of the tire 10).

As illustrated in FIG. 1, the tire 10 according to the present exemplary embodiment includes a carcass 12 straddling a pair of bead cores, not illustrated in the drawings, a belt layer 14 provided at the tire radial direction outside of the carcass 12, and a belt protection layer 20 provided at the tire radial direction outside of the belt layer 14. The carcass 12 is configured by at least one carcass ply, and the carcass ply is formed by covering plural cords 12A (such as organic fiber cords or metal cords) with covering rubber (see FIG. 2).

The belt layer 14 is provided at the tire radial direction outside of the carcass 12, and the belt layer 14 is configured including an inner belt layer 16 and an outer belt layer 18 in sequence from the tire radial direction inside. As illustrated in FIG. 2, the inner belt layer 16 is formed from plural cords 16A (such as organic fiber cords or metal cords) extending around the tire circumferential direction, and a tire width direction intermediate portion side of the inner belt layer 16 (in the vicinity of the equatorial plane CL) is thicker than both tire width direction edge portions of the inner belt layer 16 (see FIG. 1).

The outer belt layer 18 is formed from plural cords 18A (such as organic fiber cords or metal cords) that are oblique with respect to the tire circumferential direction, and as an example in the present exemplary embodiment, the cords 18A are configured so as to intersect with each other. However, there is no limitation thereto, and cords 18A may be formed so as not to intersect with each other.

The belt protection layer 20, serving as a sheet shaped belt protection member, is provided at the tire radial direction outside of the outer belt layer 18. The belt protection layer 20 is formed by plural wave-shaped cords 20A (such as organic fiber cords or metal cords) extending around the tire circumferential direction and covered with a covering rubber. As an example in the present exemplary embodiment, the belt protection layer 20 is formed from wave-shaped cords with an amplitude direction in the tire width direction. Note that there is no limitation thereto, and for example, the belt protection layer 20 may be formed from cords extending in zigzag shapes or crank shapes. Moreover, a single belt protection layer 20 is provided in the present exemplary embodiment; however, plural of the belt protection layers 20 may be stacked together.

The belt protection layer 20 is formed by winding an elongated sheet onto the circumferential outside of the outer belt layer 18, and includes a joint 20B where end portions of the belt protection layer 20 abut each other. In the present exemplary embodiment, a single belt protection layer 20 is employed, and the joint 20B is formed only at a single location. However, there is no limitation thereto, and plural joints 20B may be provided.

A tread section 22 that is formed from tread rubber and contacts the pavement is provided at the tire radial direction outside of the belt protection layer 20. Note that the tread section 22 is formed with plural circumferential direction grooves extending in the tire circumferential direction, and more specifically, as illustrated in FIG. 2, the tread section 22 is formed with a pair of left and right first circumferential direction grooves 24 on either side of the equatorial plane CL, and a pair of left and right second circumferential direction grooves 26 provided at the tire width direction outside of each first circumferential direction groove 24. As an example in the present exemplary embodiment, the four circumferential direction grooves mentioned above are provided. However, there is no limitation thereto, and for example, three circumferential direction grooves may be formed on both the left and right sides of the equatorial plane CL, to give a total of six. Conversely, the pair of left and right first circumferential direction grooves 24 alone may be formed.

A first land portion 28 demarcated by the first circumferential direction grooves 24 is provided at the tire width direction intermediate portion of the tread section 22. Second land portions 30 demarcated by the first circumferential direction grooves 24 and the second circumferential direction grooves 26 are each provided at the tire width direction outside of the first land portion 28. Shoulder portions 32 are provided on both tire width direction edge portions of the tread section 22 at the tire width direction outside of the respective second land portions 30.

A width (tire width direction length) W1 of the first land portion 28 is formed wider than a width W2 of each of the second land portions 30. The second land portions 30 provided at two locations on either side of the equatorial plane CL are both formed with the same width W2 as each other. The shoulder portions 32 provided at two locations are also formed with the same width. Note that there is no limitation thereto, and, for example, the widths of the second land portions 30 formed at two locations may be formed with different widths to each other. Moreover, the width of the second land portions 30 may be formed wider than the width of the first land portion 28.

Next, detailed explanation follows regarding the belt protection layer 20. As illustrated in FIG. 3, the belt protection layer 20 is incised at uniform intervals in the tire circumferential direction. Specifically, the belt protection layer 20 positioned within the first land portion 28 (on the tire radial direction inside of the first land portion 28) is formed with first incision portions 36 by incising the belt protection layer 20 at uniform intervals in the tire circumferential direction. As an example in the present exemplary embodiment, the first incision portions 36 are formed at 24 locations at uniform intervals in the tire circumferential direction; however, there is no limitation thereto, and the incision locations of the first incision portions 36 are set as appropriate according to the strength demanded of the belt protection layer 20, and so on.

The first incision portions 36 extend along the tire width direction, and the incision length of each first incision portion 36 is configured as by incising over the same width as the width of the first land portion 28. The first incision portions 36 are narrow incisions, in a state forming hardly any gaps in the belt protection layer 20. The belt layer 14 and the like on the tire radial direction inside of the belt protection layer 20 are not incised, and only the belt protection layer 20 is incised to configure the first incision portions 36. Note that it is sufficient that the first incision portions 36 incise the wave-shaped cords 20A configuring the belt protection layer 20, and the covering rubber covering the wave-shaped cords 20A may be continuous, and not incised.

The belt protection layer 20 positioned within the second land portions 30 is formed with second incision portions 38 by incising the belt protection layer 20 at uniform intervals in the tire circumferential direction. The second incision portions 38 extend along the tire width direction, and the incision length of each second incision portion 38 is configured by incising over the same width as the width of the second land portions 30. The second incision portions 38 are formed by incising the belt protection layer 20 alone, and the belt layer 14 is not incised.

The first incision portions 36 and the second incision portions 38 are formed by incising mutually different positions around the circumferential direction. As an example in the present exemplary embodiment, the second incision portions 38 are formed at intermediate portions of a pitch P1 of the first incision portions 36; however, there is no limitation thereto, and the second incision portions 38 may be configured by incising at portions away from the intermediate portions of the pitch P1. Moreover, the first incision portions 36 and the second incision portions 38 may be formed at the same positions as each other around the tire circumferential direction.

The first incision portions 36 are formed at a narrower pitch than the second incision portions 38. In the present exemplary embodiment, the pitch P1 of the first incision portions 36 is formed as a pitch that is half a pitch P2 of the second incision portions 38; however, there is no limitation thereto. For example, the pitch P2 of the second incision portions 38 may be three times the pitch P1 of the first incision portions 36. Preferably, configuration is made such that the ratio of the width W1 of the first land portion 28 against the width W2 of each second land portion 30 is inversely proportional to the ratio of the pitch P1 of the first incision portions 36 against the pitch P2 of the second incision portions 38. Namely, in cases in which the width W1 of the first land portion 28 is twice the width of the width W2 of the second land portions 30, the pitch P1 of the first incision portions 36 is preferably formed as half the pitch P2 of the second incision portions 38.

Note that in the present exemplary embodiment, the belt protection layer 20 positioned within the shoulder portions 32 is not is incised; however, the belt protection layer 20 may be incised at uniform intervals in the tire circumferential direction, similarly to the first land portion 28 and the second land portions 30. The first incision portions 36 and the second incision portions 38 are formed by incising the belt protection layer 20 along the tire width direction; however, there is no limitation thereto. For example, the incisions may be formed obliquely with respect to the tire width direction. The first incision portions 36 and the second incision portions 38 are not limited to straight line shapes, and may be zigzag shaped or wave shaped incisions.

Next, explanation follows regarding effects of the tire 10 according to the present invention. When an aircraft fitted with the tire 10 according to the present invention runs over a protruding object on the pavement, the tread rubber is sometimes penetrated if the protruding object is comparatively large; however, the belt protection layer 20 contacts the protruding object, enabling ingression of the protruding object into the belt layer 14 to be suppressed.

When the tire 10 rotates at high speed during take-off or landing, for example, the centrifugal force that arises acts evenly on the joint 20B of the belt protection layer 20, the first incision portions 36, and the second incision portions 38. Accordingly, the centrifugal force acts more evenly around the tire circumferential direction than in a conventional tire in which the belt protection layer 20 is not incised. Accordingly, the joint 20B of the belt protection layer 20, the first incision portions 36, and the second incision portions 38 deform evenly around the tire circumferential direction due to the centrifugal force arising during rotation of the tire 10, thereby enabling bulging at a single location in the tire circumferential direction to be suppressed. Namely, unevenness in the dimensions and mass around the tire circumferential direction of the tire 10 can be suppressed. Moreover, since the air pressure of the aircraft tire 10 is set at a pressure six times or greater than the air pressure of a vehicle tire, the demands for evenness in the dimensions and mass around the tire circumferential direction are greater than in vehicle tires. The configuration described above enables air pressure to act evenly around the tire circumferential direction. This thereby enables a reduction in noise and vibration during take-off and landing.

The belt protection layer 20 is incised across the same width as that of the first land portion 28, and the belt protection layer 20 is not incised, and is continuous, at between the first land portion 28 and second land portions 30. Namely, since the belt protection layer 20 is not incised, and is continuous at portions other than the first incision portions 36 and the second incision portions 38, the strength of the belt protection layer 20 can be better secured than in cases in which the belt protection layer 20 is incised from edge to edge. Bulging under the action of centrifugal force would be more liable to occur if the first incision portions 36 and the second incision portions 38 were formed at the same positions as each other around the tire circumferential direction, however, deformation of the tire 10 due to centrifugal force can be suppressed due to forming the first incision portions 36 and the second incision portions 38 at different positions to each other around the tire circumferential direction.

Incising the belt protection layer 20 positioned on the tire radial direction inside of the wide first land portion 28 at a narrow pitch enables the mass within the incised region to approach uniformity around the tire circumferential direction. Namely, the pitch P1 of the first incision portions 36 formed within the first land portion 28 is a smaller pitch than the pitch P2 of the second incision portions 38 formed within the narrow second land portions 30. Accordingly, the mass in the regions incised by the first incision portions 36 can be made closer to the mass of the regions incised by the second incision portions 38, enabling unevenness in the mass of the tire 10 around the tire circumferential direction to be suppressed. Moreover, the shear strength of cords is reduced when the cords are stretched, making them more liable to break. However, the belt protection layer 20 of the present exemplary embodiment includes wave-shaped cords, such that even when tensile force acts around the tire circumferential direction, the wave-shaped cords do not become stretched, enabling a reduction in the shear strength to be suppressed.

Test Examples

In order to confirm the advantageous effects of the tire 10 according to the present exemplary embodiment, three Example tires and a Comparative Example tire, giving a total of four tires, were prepared and tested. Explanation follows regarding the Example tires and the Comparative Example tire used in testing. The tires used in testing each had a size of APR30×8.8R15, with internal pressure set to standard internal pressure (1500 kPa). The belt protection layer 20 of each of the tires on which testing was performed was formed with first incision portions 36 in the same positions as those of the tire 10 of the first exemplary embodiment, and was not formed with the second incision portions 38.

Example 1: A tire formed with the first incision portions 36 at 8 locations at uniform intervals in the tire circumferential direction Example 2: A tire formed with the first incision portions 36 at 12 locations at uniform intervals in the tire circumferential direction Example 3: A tire formed with the first incision portions 36 at 24 locations at uniform intervals in the tire circumferential direction Comparative Example: A conventional tire not formed with the first incision portions 36.

Test Details: Repeated landing testing was performed, and the number of repetitions until damage to the joint 20B occurred was measured. Table 1 illustrates measurement results for the Examples 1 to 3, taking the number of repetitions for the comparative example as 100. Test conditions were set based on ARP 5257. For cut durability evaluation, the average cut depth was measured after running over a cutter with a blade width of 500 mm. Table 1 illustrates measurement results, with the comparative example set to 100. The higher the value, the higher the durability.

TABLE 1

|  | Comparative Example 1 | Example 1 | Example 2 | Example 3 |
| --- | --- | --- | --- | --- |
| Number of first incisions | 0 | 8 | 12 | 24 |
| Joint durability | 100 | 105 | 108 | 108 |
| Cut durability | 100 | 100 | 99 | 98 |

As illustrated by the test results in Table 1, it was confirmed that the mass evenness characteristics of the tire are improved, and the joint 20B is made less vulnerable to damage, by increasing the number of the first incision portions 36. Moreover, regarding cut durability, it was confirmed that no obvious effect on durability is observed even when the number of the first incision portions 36 is increased.

Second Exemplary Embodiment

Next, explanation follows regarding a tire 50 according to a second exemplary embodiment of the present invention. Note that configurations similar to in the first exemplary embodiment are allocated the same reference numerals, and explanation thereof is omitted. The tire 50 of the present exemplary embodiment has the same internal structure as the tire 10 of the first exemplary embodiment illustrated in FIG. 1 and FIG. 2; however, the locations where the belt protection layer 20 is incised differ from in the tire 10 of the first exemplary embodiment.

As illustrated in FIG. 4, portions of the belt protection layer 20 positioned at the tire radial direction inside of the first land portion 28 are formed with the first incision portions 36 incised at uniform intervals in the tire circumferential direction of the belt protection layer 20, and portions of the belt protection layer 20 positioned at the tire radial direction inside of the second land portions 30 are formed with second incision portions 52, 54 incised at uniform intervals in the tire circumferential direction of the belt protection layer 20. The second incision portions 52 and the second incision portions 54 are formed at different positions to each other around the tire circumferential direction.

In the tire 50 of the present exemplary embodiment, the belt protection layer 20 is incised at different positions around the tire circumferential direction, thereby enabling deformation of the tire 50 due to centrifugal force to be made more even around the tire circumferential direction than in cases in which the belt protection layer 20 is incised at a width equal to a positions around the tire circumferential direction. Namely, making the second incision portions 52 and the second incision portions 54 at different incision locations to each other around the tire circumferential direction enables the dimensions and mass of the tire 50 to be made more even around the tire circumferential direction. Other effects are similar to those of the first exemplary embodiment.

Explanation has been given regarding the first and second exemplary embodiments of the present invention; however, the present invention is not limited to these exemplary embodiments, and obviously various embodiments may be implemented within a range not departing from the spirit of the present invention. For example, the first circumferential direction grooves 24 and the second circumferential direction grooves 26 may be formed obliquely with respect to the tire circumferential direction, or the tread section 22 may be formed with width direction grooves extending along the tire width direction.

The entire contents of Japanese Patent Application No. 2013-092585, filed on Apr. 25, 2013, are incorporated herein by reference.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. An aircraft tire comprising:
   a belt layer provided further to a tire radial direction outside than a carcass; and
   a sheet shaped belt protection member that is wound around a tire circumferential direction between a tread section and the belt layer, and that includes incision portions incised along a tire width direction, with the incision portions formed at uniform intervals around the tire circumferential direction, wherein
   the tread portion includes a land portion demarcated by a plurality of circumferential direction grooves extending around the tire circumferential direction;
   the belt protection member is incised at the same width as the land portion;
   the tread portion includes a plurality of the land portions;
   the belt protection member is incised at different positions around the tire circumferential direction at positions inside adjacent land portions; and
   the belt protection member is incised at a narrower pitch around the tire circumferential direction at positions within a wide land portion than where the belt protection member is positioned facing a narrow land portion.

2. The aircraft tire of claim 1, wherein the belt protection member includes a plurality of wave-shaped cords extending in a wave shape with an amplitude direction in the tire width direction.

* * * * *